(12) United States Patent
Zearbaugh

(10) Patent No.: US 7,017,865 B2
(45) Date of Patent: *Mar. 28, 2006

(54) METHODS FOR SECURING A TUBE TO AN ENGINE HOUSING

(75) Inventor: Scott R. Zearbaugh, Milford, OH (US)

(73) Assignee: General Electric Company, Schenectady, NY (US)

( * ) Notice: Subject to any disclaimer, the term of this patent is extended or adjusted under 35 U.S.C. 154(b) by 109 days.

This patent is subject to a terminal disclaimer.

(21) Appl. No.: 10/674,042

(22) Filed: Sep. 29, 2003

(65) Prior Publication Data

US 2005/0109886 A1    May 26, 2005

Related U.S. Application Data

(62) Division of application No. 09/410,240, filed on Sep. 30, 1999, now Pat. No. 6,655,642.

(51) Int. Cl.
F16L 3/08  (2006.01)
F16L 3/123 (2006.01)

(52) U.S. Cl. ....................................................... 248/65

(58) Field of Classification Search ................ 248/65, 248/67.7, 68.1, 69, 70, 71, 72, 73, 74.1, 74.4, 248/223.41, 224.51, 224.61, 221.4, 340, 248/345.1, 317, 554–557; 403/381, 331; 285/420; 211/70.4, 70.6

See application file for complete search history.

(56) References Cited

U.S. PATENT DOCUMENTS

| | | | | |
|---|---|---|---|---|
| 448,550 A * | 3/1891 | Scott | ............................ | 248/65 |
| 453,860 A * | 6/1891 | Francis | ......................... | 403/381 |
| 622,739 A * | 4/1899 | Wahlert | ...................... | 248/74.4 |
| 917,891 A * | 4/1909 | Pflager | ........................... | 303/1 |
| 938,216 A * | 10/1909 | Cook | ............................ | 248/65 |
| 1,322,414 A * | 11/1919 | Elkins | ......................... | 248/74.4 |
| 1,455,609 A * | 5/1923 | Hannaford | ..................... | 248/67 |
| 2,368,619 A * | 2/1945 | Soderberg | ..................... | 248/65 |
| 2,546,792 A * | 3/1951 | Smith et al. | .................... | 248/58 |
| 2,714,496 A * | 8/1955 | Doyle | ......................... | 248/539 |
| 2,955,790 A * | 10/1960 | Sylvester | ..................... | 248/65 |
| 3,414,219 A * | 12/1968 | Siegel | ........................... | 248/65 |
| 4,019,638 A * | 4/1977 | Miller | ........................... | 211/74 |
| 4,090,796 A * | 5/1978 | Okuda et al. | .................. | 403/24 |
| 4,300,271 A * | 11/1981 | Wohlhaupter | .................. | 384/7 |
| 4,373,401 A * | 2/1983 | Baumoel | ................. | 73/861.18 |
| 4,481,269 A * | 11/1984 | Barrett, Jr. | .................. | 429/121 |
| 4,555,083 A * | 11/1985 | Carter | ......................... | 248/313 |
| 4,676,472 A * | 6/1987 | Kamrud, Sr. | ............... | 248/542 |
| 4,804,158 A * | 2/1989 | Collins et al. | ............. | 248/74.4 |
| 5,040,753 A * | 8/1991 | Roth | ......................... | 248/74.2 |
| 5,054,159 A * | 10/1991 | Richardson | .................. | 15/400 |
| 5,058,843 A * | 10/1991 | Koster | ................... | 248/223.41 |
| 5,269,486 A * | 12/1993 | Hufford | ................. | 248/231.61 |
| 5,271,588 A * | 12/1993 | Doyle | ......................... | 248/68.1 |

(Continued)

Primary Examiner—Jennifer E. Novosad
(74) Attorney, Agent, or Firm—William Scott Andes; Armstrong Teasdale LLP

(57) ABSTRACT

The present invention is a unitary strap clamp for securing tubing to an aircraft engine housing. The clamp includes a first portion with a first thickness and a second portion extending from the first portion and with a second thickness. The clamp is rigid and remains flat when the tubing is secured to the aircraft engine housing. The clamp includes a plurality of apertures which receive threaded fasteners used to secure the tubing and the strap clamp to the aircraft engine housing.

6 Claims, 3 Drawing Sheets

U.S. PATENT DOCUMENTS

| | | | |
|---|---|---|---|
| 5,292,013 A * | 3/1994 | Earl | 248/73 |
| 5,441,220 A * | 8/1995 | Carlson | 248/154 |
| 5,468,092 A * | 11/1995 | Saunders | 403/385 |
| D393,747 S * | 4/1998 | Salvucci, Sr. | D3/323 |
| 5,794,897 A * | 8/1998 | Jobin et al. | 248/74.4 |
| 5,904,325 A * | 5/1999 | Hung | 248/74.4 |
| 5,996,945 A * | 12/1999 | Coles et al. | 248/68.1 |
| D420,277 S * | 2/2000 | Burke et al. | D8/380 |
| 6,070,745 A * | 6/2000 | Dembicks | 211/70.6 |
| 6,186,452 B1 * | 2/2001 | Zearbaugh et al. | 248/74.4 |
| 6,193,015 B1 * | 2/2001 | Kato et al. | 187/226 |
| 6,353,960 B1 * | 3/2002 | Jannicelli, Jr. | 15/246 |

* cited by examiner

METHODS FOR SECURING A TUBE TO AN ENGINE HOUSING

This application is a divisional of U.S. application Ser. No. 09/410,240, filed Sep. 30, 1999 now U.S. Pat. No. 6,655,642, which is hereby incorporated by reference.

BACKGROUND OF THE INVENTION

This invention relates generally to clamps and, more particularly, to strap clamps for securing tubing to an aircraft engine housing.

Aircraft engine assemblies require a vast number of pipes and tubes to be connected between components. The tubing and piping is often routed in a space located between an aircraft engine housing and an aircraft engine cowling. Although isolated, this area is still subjected to the high temperatures and high vibrations operated by the aircraft engine. As a result, any clamp assemblies securing tubing in these areas are also subjected to the high temperatures and high vibrations. Typically these clamp assemblies include a bracket assembly anchored to the aircraft engine housing, and a clamp positioned around the tubing to be anchored and attached to the bracket assembly. Because the bracket assembly is typically secured more rigidly to the aircraft engine housing than the clamp is capable of being secured to the bracket, the clamp is subjected to much more stress than the clamp bracket.

Clamping systems typically utilize a multi-piece clamp which consists of a flat base member and an upper member welded to the base member. Often the upper member is pre-formed to fit around a specific outer diameter of piping to be anchored. Additionally, often the lower member is also pre-formed to receive a specific outer diameter of piping. A problem with known clamps is that under the high vibrations encountered by the clamping assemblies, the clamps have a tendency to crack and fail due to vibrational fatigue. In particular, those clamps that are pre-formed have a tendency to fail at a location near the apex of the pre-formed bend or at any of the weld locations between the members. In some instances, these failures lead to failure of the base member and eventually to a failure of the particular tubing being secured to the housing.

BRIEF SUMMARY OF THE INVENTION

In an exemplary embodiment of the invention, a lower strap clamp installs easily, is reliable, and is resilient to vibrations induced by an aircraft engine.

The lower strap clamp includes an elongate body having a unitary first portion and a second portion. The first portion has a first thickness and the second portion has a second thickness which is thicker than the first thickness. The elongate body is rigid and remains flat when tubing is anchored to it. The second portion is generally rectangular shaped and extends from the first portion. Since the second portion is unitary with the first portion, no welds are utilized on the strap clamp. The lower strap clamp includes a plurality of apertures which receive threaded connectors used to anchor the strap clamp to a structure.

During assembly, a wear sleeve is attached and encircles the tubing being anchored. An upper strap includes a plurality of openings and is bent and formed around the tubing such that the openings on the upper strap clamp align with the apertures on the lower strap clamp. The fasteners pass through the upper strap clamp and extend through the lower clamp bracket to anchor the tubing to the structure. As a result, the risk of the lower clamp failing due to the high vibrations induced by the aircraft engine is minimized.

DETAILED DESCRIPTION OF THE INVENTION

Figure 1:
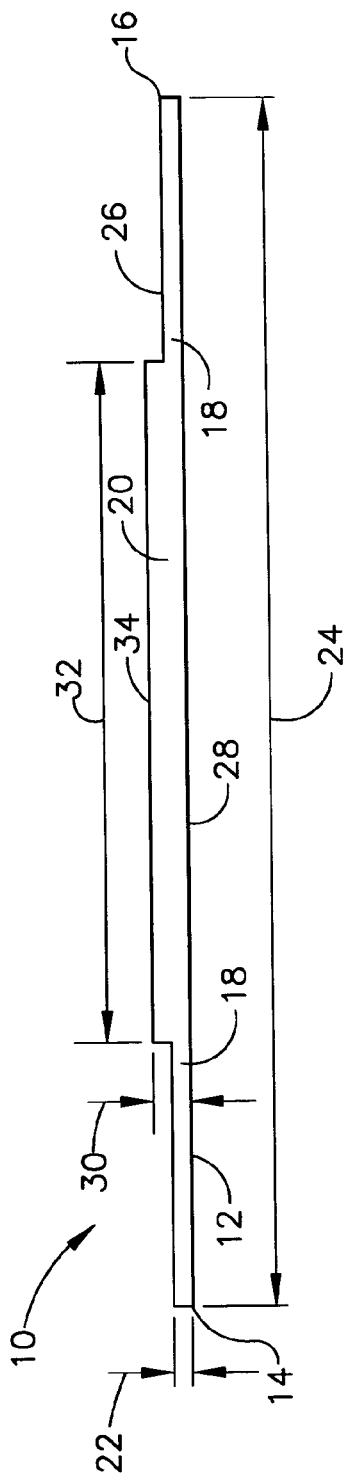
FIG. 1 is a side elevational view of a strap clamp.

FIG. 1 is a side elevational view of a strap clamp 10 including an elongate body 12 which has a first end 14 and a second end 16. Elongate body 12 is rigid and is substantially flat. As such, first end 14 and second end 16 are substantially co-planar. In one embodiment, elongate body 12 is machined from a metal such as stainless steel. Alternatively, elongate body is machined from titanium or inconel. Strap clamp 10 is utilized to anchor a tubing (not shown in FIG. 1) to an aircraft engine housing (not shown in FIG. 1). In one embodiment, strap clamp 10 is utilized to anchor tubing having an outside diameter of 2.5 inches.

Elongate body 12 is unitary and includes a first portion 18 and a second portion 20 extending from first portion 18. First portion 18 has a first thickness 22, a length 24, and a width (not shown in FIG. 1). Thickness 22 is substantially constant within first portion 18. First portion 18 is generally rectangular in shape and includes a top surface 26, a bottom surface 28, and a length 29. Strap clamp 10 is rigid and remains flat when installed. In one embodiment, length 29 is approximately 0.9 inches. Top surface 26 is generally parallel to bottom surface 28. Second portion 20 has a thickness 30, a length 32, and a width (not shown in FIG. 1). Second portion thickness 30 is substantially constant within second portion 20 and is thicker than first portion thickness 22. In one embodiment, elongate body 12 is machined such that first portion thickness 22 is about 0.063 inches and second portion thickness 30 is about 0.125 inches. Second portion 20 is generally rectangular in shape and includes a top surface 34 which is generally parallel to bottom surface 28.

Figure 2:
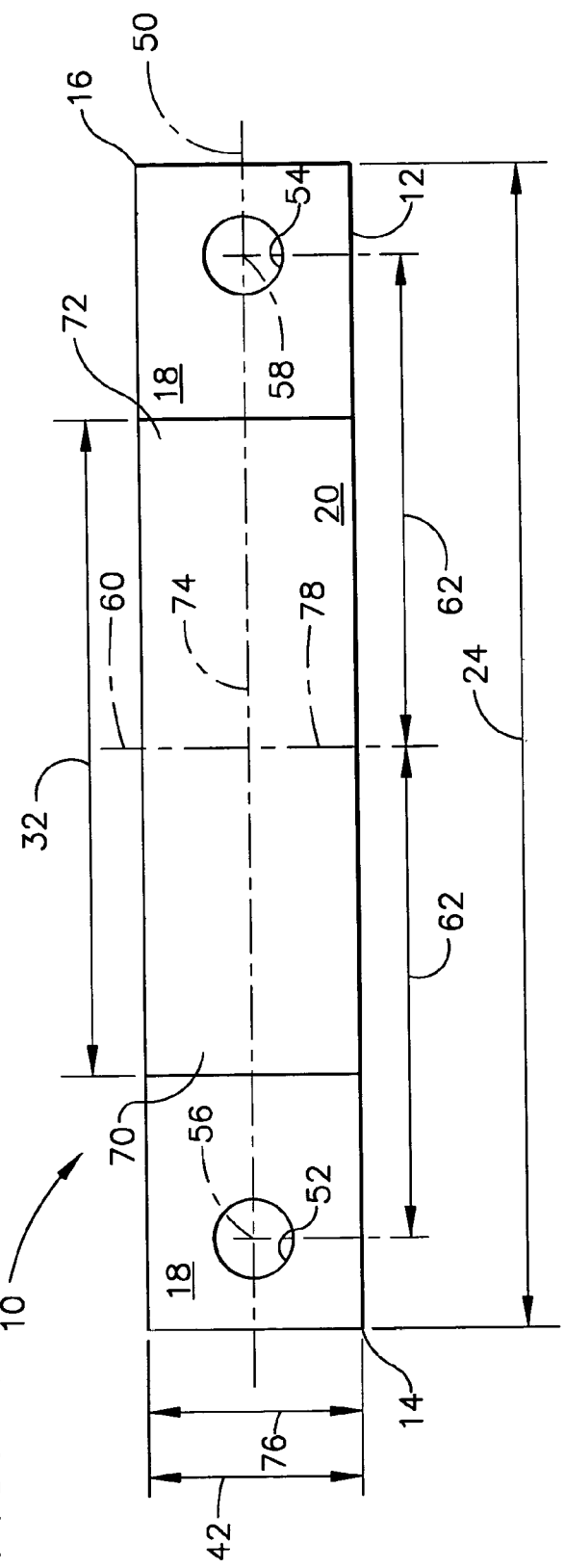
FIG. 2 is a plan view of the strap clamp shown in FIG. 1.

FIG. 2 is a plan view of strap clamp 10. Strap clamp 10 includes elongate body 12 which is generally rectangular in shape. Elongate body 12 includes first portion 18 and second portion 20. First portion 18 extends from first end 14 to second end 16 and has a length 24 and a width 42. In one embodiment, length 24 is approximately 4.118 inches and width 42 is approximately 0.75 inches. First portion 18 also includes an axis of symmetry 50 which extends from first end 14 to second end 16. An aperture 52 is disposed within first portion 18 adjacent first end 14 and a second aperture 54 is disposed within first portion 18 adjacent second end 16. Aperture 52 includes a center 56 and second aperture 54 includes a center 58. First portion 18 includes a second axis of symmetry 60 which is perpendicular to axis of symmetry 50. Center 56 and center 58 are positioned on axis of symmetry 50, each a distance 62 from axis of symmetry 60. In one embodiment distance 62 is approximately 1.739 inches. Apertures 52 and 54 are substantially the same size and in one embodiment each has a diameter of approximately 0.281 inches.

Second portion 20 is generally rectangular in shape and includes a first end 70, a second end 72, and an axis of symmetry 74 which extends from first end 70 to second end 72. Second portion 20 includes length 32 and a width 76. Length 32 is less than length 24 and width 76 is substantially equal to width 42. In one embodiment, strap clamp 10 is machined such that length 32 is approximately 2.318 inches and width 76 is approximately 0.75 inches. Second portion 20 includes a second axis of symmetry 78 which is perpendicular to axis of symmetry 74. Strap clamp 10 is machined such that second portion 20 is centered on first portion 18 such that axis of symmetry 74 is co-axial with axis of symmetry 50 and axis of symmetry 78 is co-axial with axis of symmetry 60.

Figure 3:
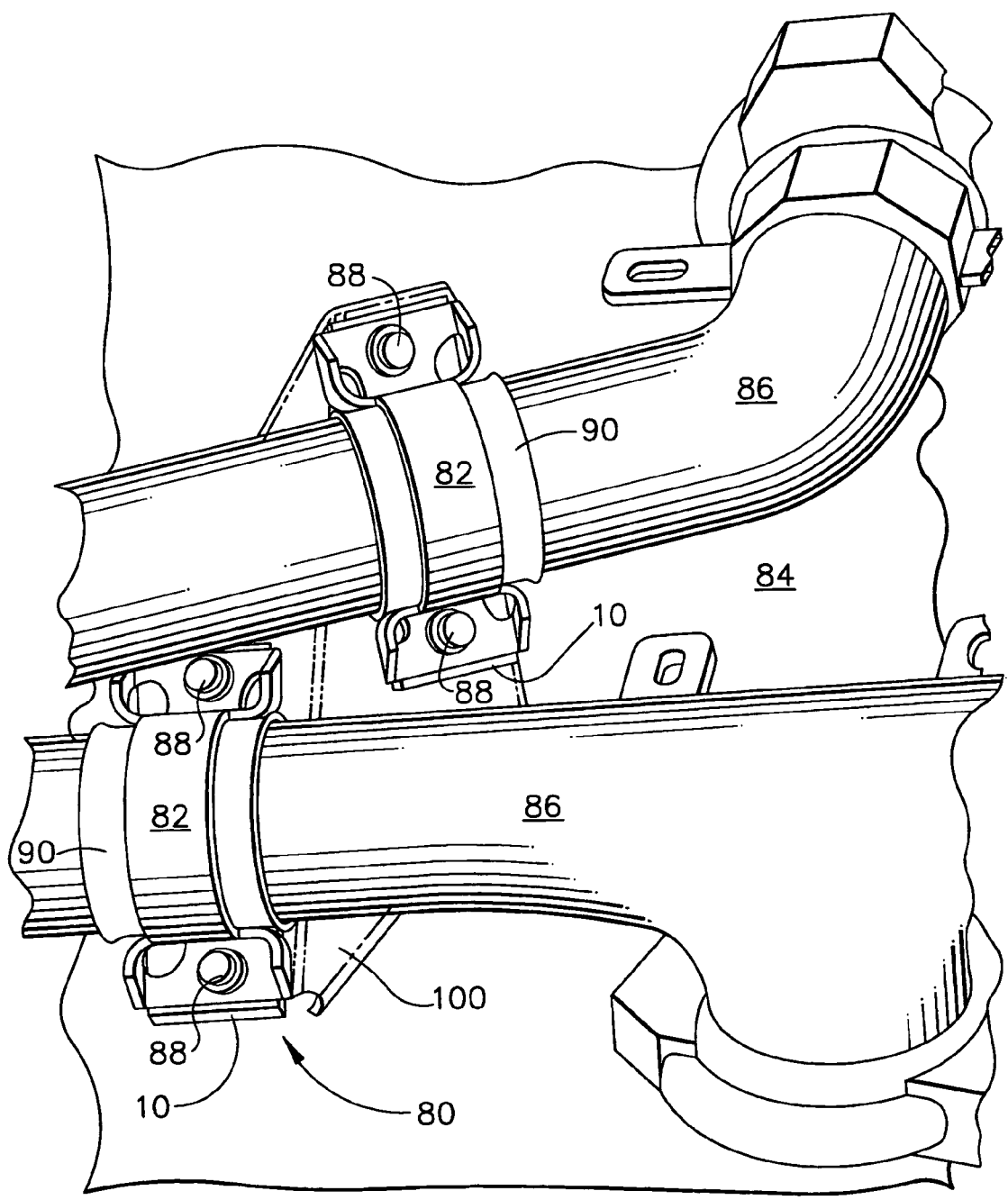
FIG. 3 is a partial perspective view of a clamping assembly including the strap clamp shown in FIG. 1.

FIG. 3 is a perspective view of a clamping assembly 80 including lower strap clamp 10 and upper strap clamp 82. Lower strap clamp 10 remains flat and is positioned above a clamp bracket (not shown in FIG. 3) which is anchored to an aircraft engine housing 84. A plurality of tubing and piping 86 traverse housing 84 leading to various aircraft engine components (not shown). Clamping assembly 80 is utilized to anchor tubing 86 to housing 84. Upper strap clamp bracket 82 includes a pair of apertures (not shown) which threaded fasteners 88 extend through to secure upper clamp bracket 82 to lower strap clamp 10.

In operation, a wear sleeve 90 is installed around tubing 86 to provide additional wearing protection to tubing 86 in those areas which are anchored to aircraft engine housing 84. Upper strap clamp 82 is bent to conform to tubing 86 and is form fit over wear sleeve 90 such that the respective openings positioned within upper strap clamp 82 are in alignment with apertures 52 and 54. Threaded fasteners 88 pass through upper strap clamp 82, strap clamp 10, and through the clamp bracket to tighten to housing 84.

Figure 4:
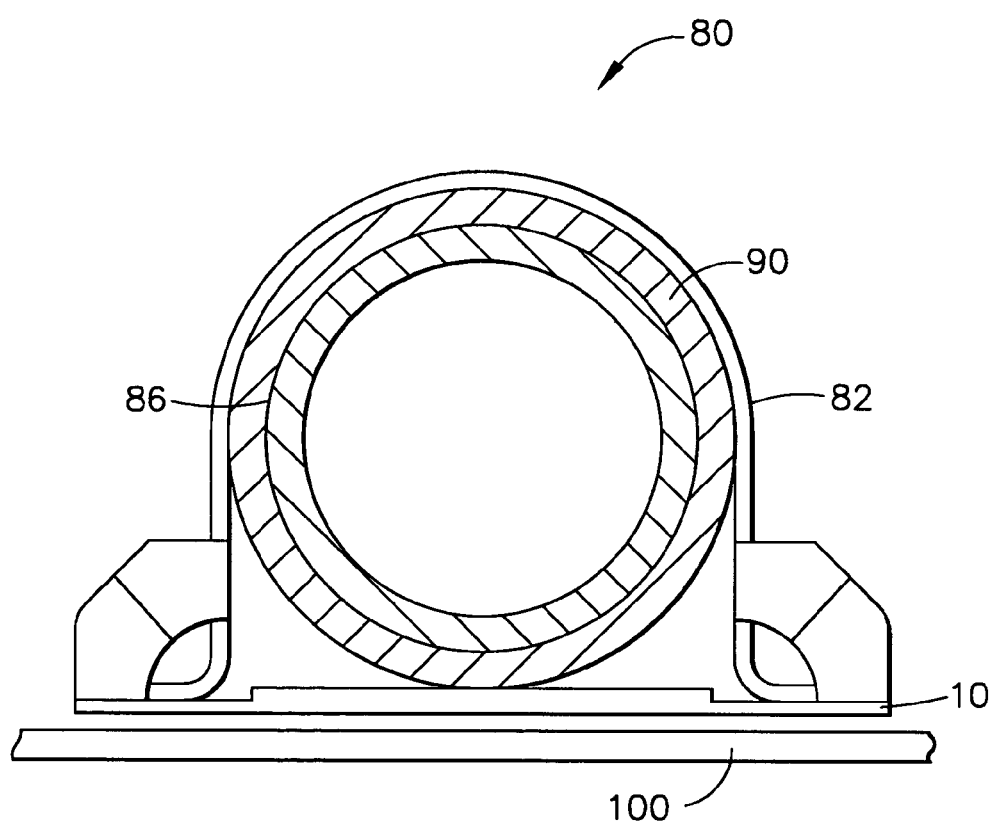
FIG. 4 is a cross-sectional view of the clamping assembly shown in FIG. 3.

FIG. 4 is a cross-sectional view of clamping assembly 80 including lower strap clamp 10 and upper strap clamp 82. Upper strap clamp 82 is formed around wear sleeve 90 which encircles tubing 86. Upper strap clamp 82 includes openings (not shown) which receive threaded fasteners 88 (shown in FIG. 3). Threaded fasteners 88 extend through the openings in upper strap clamp 82, through apertures 52 and 54 (shown in FIG. 2) and through openings (not shown) in a clamp bracket 100 to tighten to aircraft housing 84 (shown in FIG. 3). When clamping assembly 80 is fully installed, strap clamp 10 remains unbent and substantially flat.

The above described unitary strap clamp for securing a tubing to an aircraft engine housing is reliable, easily installed, and is machined. The strap clamp includes no welds which reduces the risk of the clamp failing due to high vibrational fatigue. As such a cost-effective and reliable clamp is provided.

While the invention has been described in terms of various specific embodiments, those skilled in the art will recognize that the invention can be practiced with modification within the spirit and scope of the claims.

The invention claimed is:

1. A method of securing a tube to an engine housing using a clamping assembly, said method comprising:

securing a first strap clamp to the engine housing wherein the first strap clamp includes a unitary elongate body that has a first portion, a second portion, and a third portion wherein the first portion is identical to the third portion and has an upper surface, a lower surface, and a thickness extending therebetween, and wherein the second portion extends between the first and third portions, and has an upper surface, a lower surface, and a substantially constant thickness extending therebetween that is greater that the thickness of the first and third portions, wherein the second portion lower surface is substantially co-planar with the first portion lower surface; and securing the tube to the first strap clamp with a second strap clamp, such that at least a portion of the tube is retained between the first and second clamps.

2. A method in accordance with claim 1 wherein securing the tube to the first strap clamp further comprises bending the second strap clamp around the tube to position a plurality of openings defined within the second strap clamp in substantial alignment with a plurality of apertures defined within the first strap clamp.

3. A method in accordance with claim 2 wherein securing the tube to the first strap clamp further comprises inserting at least two threaded fasteners through the openings into the apertures and tightening the second strap clamp to the first strap clamp.

4. A method in accordance with claim 1 wherein securing the tube to the first strap clamp further comprises securing the tube to the first strap clamp such that the tube is secured against only the second portion of the first strap clamp.

5. A method in accordance with claim 1 wherein securing the tube to the first strap clamp further comprises using a stainless steel second strap clamp to secure the tube to the first strap clamp.

6. A method in accordance with claim 1 wherein securing the tube to the first strap clamp further comprises using a substantially rectangular second strap clamp to secure the tube to the first strap clamp.

\* \* \* \* \*